United States Patent [19]
Preston

[11] 3,715,056
[45] Feb. 6, 1973

[54] HANDLING APPARATUS FOR ROD-LIKE ARTICLES

[75] Inventor: Edward George Preston, London, England

[73] Assignee: Molins Machine Company Limited, London, England

[22] Filed: Dec. 30, 1970

[21] Appl. No.: 102,753

[30] Foreign Application Priority Data

Dec. 31, 1969 Great Britain..................63451/69

[52] U.S. Cl. .....................221/211, 73/45.3, 209/82
[51] Int. Cl...............................................G01m 3/34
[58] Field of Search ..........221/211; 73/41, 45, 45.3; 109/82

[56] References Cited

UNITED STATES PATENTS 2,942,606  6/1960  Rowlands..........................209/82 X
2,979,228  4/1961  Englert............................221/211 X Primary Examiner—Robert B. Reeves
Assistant Examiner—Thomas E. Kocovsky
Attorney—Craig, Antonelli, Stewart & Hill

[57] ABSTRACT

A fluted drum forms the base of a hopper for multiple length rods of filter plug material and has suction applied to the flutes to assist in loading the flutes with the rods. The suction is maintained over part of the length of each flute outside the hopper so that only full length rods are retained.

3 Claims, 5 Drawing Figures

HANDLING APPARATUS FOR ROD-LIKE ARTICLES

The present invention relates to handling apparatus for rod like articles and is more particularly concerned with apparatus for removing rod like articles such as lengths of filter plug material from a hopper.

In the manufacture of filter cigarettes a bulk supply of lengths of filter plug material is provided in a hopper, and a conveyor with transverse channels, such as a fluted drum, is arranged to form a wall of the hopper so that a length of filter plug material is removed from the hopper in each flute of the drum. As speeds of operation increase, so the speed at which the flutes pass through the hopper increases, and greater difficulty is experienced in making sure that each flute contains a length of filter plug material as it leaves the hopper. If flutes of the drum pass through the hopper without picking up a length of filter plug material then clearly the output of the apparatus is correspondingly reduced and the fluted drum runs at a higher speed than should be necessary for the output in terms of the number of lengths of filter plug material collected.

According to the present invention there is provided apparatus for handling rod-like articles comprising a hopper for containing a supply of the articles, a conveyor having transverse channels each for receiving an article e.g. a fluted drum, a portion of the conveyor forming a boundary surface of the hopper, such as its base to be in contact with the supply of articles to remove articles therefrom, and means to apply suction to the channels of said portion of the conveyor to assist in loading each channel with an article and maintaining the article therein.

Suction may also be applied to the channels of the conveyor after the conveyor has passed away from the hopper, and suction may be cut off from the mid portion of the channels after the conveyor has left the hopper, sufficient suction being applied at the end portion of the channels to retain full length articles in the channel. By this means an article which is shorter than a predetermined length can be arranged to fall out of its channel so that it is rejected.

How the invention may be carried out will now be described, by way of example only, with reference to the accompanying drawings in which.

Figure 1:
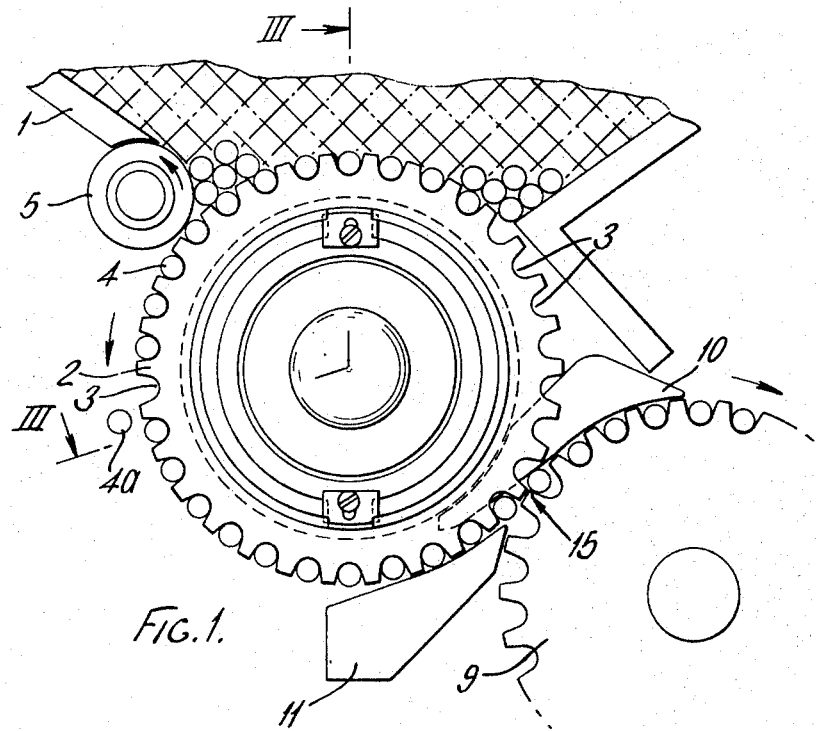
FIG. 1 is a side elevational view of one embodiment according to the present invention.

Lengths of filter plug material in the form of multiple filter plug lengths 4 are fed into a hopper 1 by any suitable means and are removed from the hopper 1 by a conveyor having transverse channels in the form of a drum 2 having flutes 3, a portion of the drum 2 forming the base of the hopper. The drum 2 rotates in the direction shown by the arrow.

The flutes 3 are provided with apertures through which suction is applied to assist in getting the filter plug lengths 4 into the flutes and to maintain them in the flutes while the flutes are passing through the hopper.

The hopper 1 is provided with a refuser roller 5 to help ensure that the filter plug lengths are parallel with the flutes 3 and that each flute receives a filter plug length.

Suction is applied to the apertures in the flutes 3 by way of a stationary control valve 7, a sleeve 12 which rotates with the drum 2, and passages 6 within the drum 2.

Figure 3:
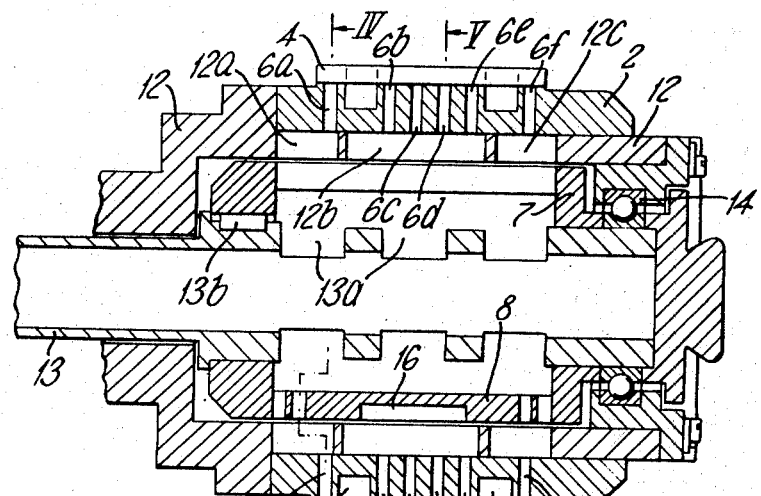
FIG. 3 is a cross sectional view taken on the line III—III of the fluted drum in FIG. 1.
Figure 4:
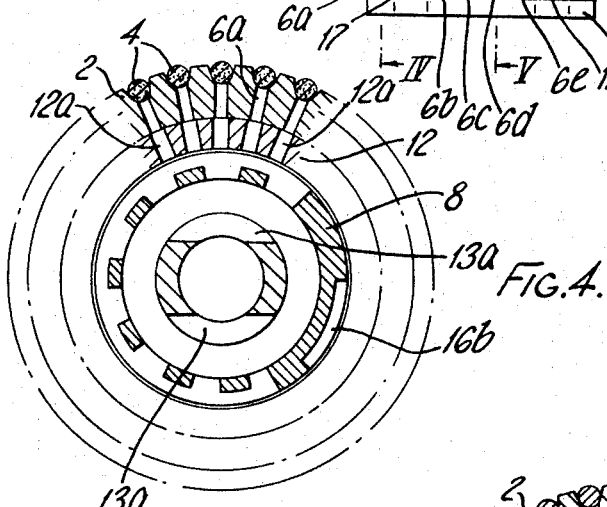
FIG. 4 is a cross-sectional view taken on the line IV—IV of FIG. 3.
Figure 5:
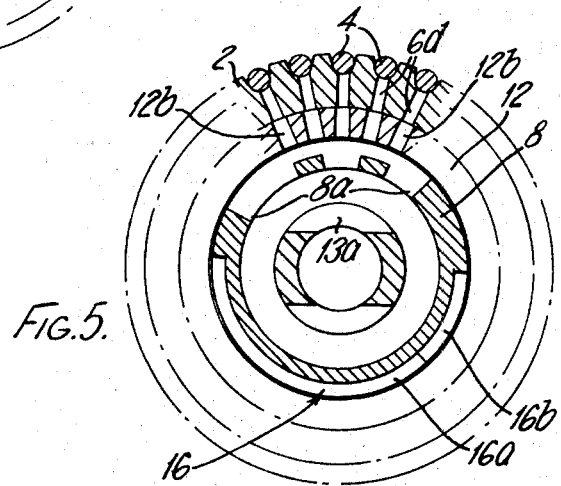
FIG. 5 is a cross-sectional view taken on the line V-V of FIG. 3.

Each flute is provided with six air passages 6a, b, c, d, e and f respectively through which suction is applied to a filter plug length 4 in the flute (FIG. 3). The sleeve 12 has a plurality of axially-extending slots 12b, each in register with the passages 6b, 6c, 6d and 6e of a flute, and similar shorters slots 12a and 12c each in register respectively with the passages 6a and 6f of a flute. The drum 2 is mounted on the sleeve 12 which is rotatable about the stationary valve 7 from which air is drawn through a central shaft 13 through slots 13a therein to provide the suction in the passages 6. The valve 7 is mounted on the shaft 13 to which it is keyed by a key 13b. The right hand end of the sleeve 12 as shown in FIG. 3 is carried by a ball bearing 14, and its left hand end (not shown) is driven, and is also mounted for rotation in a bearing. The working clearance provided between the part-cylindrical wall 8 of the valve 7 and the sleeve 12 is shown exaggerated in FIGS. 3, 4 and 5.

The plug lengths 4 are held in the flutes 3 by suction until shortly before their transfer to a further fluted drum 9 at point 15. The drum 9 may form part of apparatus for assembling filter plug lengths with cigarettes and uniting them thereto to form filter cigarettes, but it could be part of other apparatus for processing the filter plug lengths 4. Strippers 10 extend into circumferential channels 17 in the drum 2 to assist in the transfer, and guides 11 are provided to support the plugs lengths 4 immediately prior to the transfer.

Figure 2:
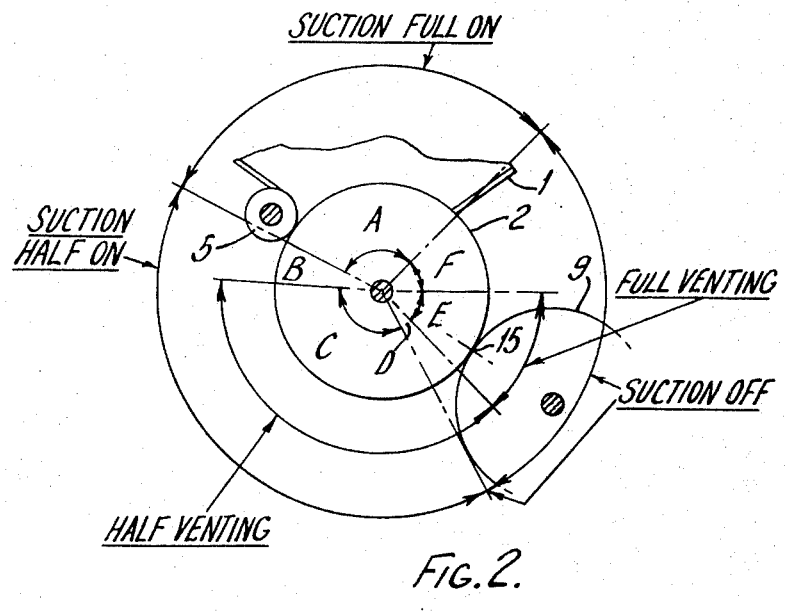
FIG. 2 is a timing diagram of the operation of the embodiment of FIG. 1.

The part-cylindrical wall 8 of the valve 7 has a cut away portion 8a which extends angularly from the point at which the flutes of the drum 2 enter the hopper to a point just after the flutes leave the hopper i.e. over the arc A shown in FIG. 2. This cutaway portion 8a is the full axial length of the valve 7 so that over the arc A suction is applied to the slots 12a, 12b and 12c and thus to all the passages 6a, 6b, 6c, 6d, 6e and 6f in the flutes 3. This is indicated in FIG. 2 by the legend "suction full on."

For the remainder of the circumferential extent of the valve 7, from the end of arc A to the beginning of arc A in the counter-clockwise direction, i.e. over the arcs B, C, D, E and F shown in FIG. 2, the part-cylindrical wall 8 cuts off suction from the slots 12b, and thus from the passages 6b, 6c, 6d and 6e to the flutes 3. This part of the wall 8 extends axially only to blank off the slot 12b so that the slots 12a and 12c are still exposed to suction over the arcs B and C i.e. to a point shortly before the point 15 at which they are transferred to the further fluted drum 9. This is indicated by the legend "suction half on" in FIG. 2. From this point to the beginning of the hopper i.e. over the arcs D, E and F, the wall 8 blanks off the slots 12a and 12c so that suction is cut off also from the slots 12a and 12c, and thus from the passages 6a and 6f. This is indicated in FIG. 2 by the legend "suction off."

After suction has been cut off from the slots 12b and the passages 6b, 6c, 6d and 6e these slots and passages are vented to atmosphere, to release any residual suction therein, by means of a circumferential slot 16 which has a portion 16a of a width less than the length of the slots 12b which extends around the wall 8 of the valve 7 to a point after the transfer point 15 where the articles 4 have been removed from the drum. At this latter point therefore the slot 16 is open to atmosphere through the slots 12b and the passages 6b, 6c, 6d and 6e. After the suction has been cut off from the slots 12a and 12c and the passages 6a and 6f, and before the transfer point 15, these slots and passages are also vented to atmosphere by means of the slot 16 having a portion 16b, the width of which extends to overlap the slots 12a and 12c. Thus, over the arcs C and D, the passages 6b, 6c, 6d and 6e are vented to atmosphere, as indicated by the legend "half venting," and over the arc E, as indicated by the legend "full venting," all the passages 6 are vented to atmosphere.

Thus, a length of filter plug material 4 which is below a predetermined length will be held by suction from only either the passage 6a or 6f when it enters the arc C, if it is held by suction at all, and will fall out of its flute, as indicated by the length 4a in FIG. 1. Lengths 4 longer than the predetermined minimum length will be held by suction from both the passages 6a and 6f and so will be retained in the flute until transferred to the drum 9.

There is thus an automatic arrangement for rejecting "short" lengths of material.

Once the lengths of filter plug material 4 are in a position to be supported by the guides 11 the suction is cut off from the end passages 6a and 6f also, but to make sure that residual suction in these passages does not hinder the clean transfer to the drum 9 these passages are also vented.

If venting of the passages 6a and 6f were to be found to be unnecessary then the portion 16b of the slot 16 would be made the same width as the portion 16a. If no venting at all were necessary then the slot 16 could be omitted entirely.

The arrangement described and shown can be used in a number of systems for handling rod-like articles where it is required to remove the rod like articles at a fast rate from a hopper and to retain only articles above a predetermined length.

What I claim as my invention and desire to secure by Letters Patent is:

1. Apparatus for handling multiple length cigarette filter rods or similar rod-like articles, comprising a hopper for containing a supply of the articles, a cylindrical drum having a plurality of transverse flutes equispaced about its periphery each for receiving an article, the drum being mounted horizontally on its axis for continuous rotation at the base of the hopper so that at any time at least two flutes are within the hopper, first transfer means for removing articles from the flutes at a level lower than the horizontal plane in which said axis lies, and second transfer means for drawing articles from said hopper into said flutes including a stationary valve mounted in the drum and having a hollow interior and means to apply suction to the hollow interior of the valve, each flute having a suction port in its mid-portion and a suction port adjacent each end, the end suction ports being spaced apart the length of an article to be held therein, the valve having a cut-away portion selectively connecting the hollow interior thereof to all of the ports of those flutes within the hopper to permit suction to load articles in the flutes, and passages selectively connecting said hollow interior to only the end ports of those flutes passing from the cut-away portion to the transfer means, the suction means and passages being arranged to provide sufficient suction to said end ports to retain full length articles in the flutes.

2. Apparatus as claimed in claim 1 wherein the valve has an arcuate vent passage extending from a position after the end of the cut-away portion to a position after the first transfer means to vent to atmosphere the suction ports in the mid-portions of the flutes after suction has been cut off from them.

3. Apparatus as claimed in claim 2 wherein the vent passage is widened after the position at which suction is cut off from the end ports to vent to atmosphere the end ports at the first transfer means.

* * * * *